United States Patent [19]
Berthon

[11] Patent Number: 5,864,323
[45] Date of Patent: Jan. 26, 1999

[54] RING ANTENNAS FOR RESONANT CIRCUITS

[75] Inventor: Alain Berthon, Cagnes Sur Mer, France

[73] Assignee: Texas Instruments Incorporated, Dallas, Tex.

[21] Appl. No.: 770,021

[22] Filed: Dec. 19, 1996

[51] Int. Cl.⁶ .............................. H01Q 1/00; H01Q 7/08
[52] U.S. Cl. ....................... 343/788; 343/741; 343/841
[58] Field of Search .................... 343/787, 788, 343/742, 867, 505, 572, 825.31

[56] References Cited

U.S. PATENT DOCUMENTS

| | | | |
|---|---|---|---|
| 2,740,113 | 1/1956 | Hemphill | 343/787 |
| 4,839,659 | 6/1989 | Stern et al. | 343/787 |
| 5,561,438 | 10/1996 | Nakazawa et al. | 343/787 |
| 5,625,366 | 4/1997 | D'Hont | 343/718 |
| 5,625,370 | 4/1997 | D'Hont | 343/788 |
| 5,671,621 | 9/1997 | Watanuki et al. | 70/278 |
| 5,694,139 | 12/1997 | Saito et al. | 343/866 |

FOREIGN PATENT DOCUMENTS

| | | |
|---|---|---|
| A-0 586 083 | 3/1994 | European Pat. Off. . |
| A-0 590 589 | 4/1994 | European Pat. Off. . |
| A-671 778 | 9/1995 | European Pat. Off. . |
| A-0 677 887 | 10/1995 | European Pat. Off. . |

*Primary Examiner*—Don Wong
*Assistant Examiner*—Tan Ho
*Attorney, Agent, or Firm*—Rebecca Mapstone Lake; Robert D. Marshall; Richard L. Donaldson

[57] ABSTRACT

A ring antenna (10) for resonant circuits for identifying metallic containers has an annular core (11) having at least one core surface (11a') corresponding to at least one surface of the container and made from ferrite. The core may be U-shaped, having a base portion and a first and second arm portions, or L-shaped, having a base portion and a first arm portion (11a). The antenna (10) also has a copper wire coil (12) wound around a first portion of the core; and an aluminum shield (13) affixed to the at least one core surface (11b') and separating the core from the surface of the container. Further, a interrogation system for identifying metallic containers includes the ring antenna (10) coupled to a resonant circuit (86) included in a transponder or a reader.

30 Claims, 6 Drawing Sheets

RING ANTENNAS FOR RESONANT CIRCUITS

BACKGROUND OF THE INVENTION

1. Field of the Invention

The invention relates to ring antennas for resonant circuits, which may be used to identify objects, and to interrogation systems including such ring antennas. Such resonant circuits may be used in transponders, readers, or the like. In particular, the invention relates to annular antennas for resonant circuits, which may be mounted on and/or around metal containers, and to interrogation systems including resonant circuits and such annular antennas.

2. Description of the Related Art

Wireless systems have been developed for remote monitoring of various parameters. Such systems may be used to identify or detect the presence, location, and number of objects at a distance. For example, an interrogation apparatus or system may use a radio frequency (RF) signal to request information from a transponder, also known as a responder device or apparatus. This information may include a preset code for identification purposes, or the requested information may be based on measurements from a sensor.

Transponders may include electronic or integrated circuits and resonant circuits used for receiving RF signals from an interrogation device or apparatus and for transmitting RF signals containing monitoring information back to an interrogation device or apparatus. Such resonant circuits include a capacitance, an inductance, and a resistance. Further, energy from the signals received by the resonant circuit may be stored and used to power the resonant circuit, thus eliminating the need for power supplies in many applications. Such stored power also may be used to excite the resonant circuit for transmission of signals back to the interrogation device or apparatus.

To further conserve energy, resonant circuits have been designed, which need not be continuously excited. Instead, the circuit may be initially excited and then periodically supplied with additional energy to maintain oscillation. This maintenance energy is supplied because the resonant circuits may suffer various losses. Other components of the transponder also may cause a damping of the oscillation, thus, resulting in decay of the oscillation. The re-excitation of a resonant circuit with maintenance energy pulses is referred to as "plucking."

With known transponders, the plucking function may be initiated after a fixed number of oscillations. For example, the plucking function may be initiated after every eight oscillations (also referred to as "ringings") of the resonant circuit. Unfortunately, the quality-factor, i.e., the Q factor, of resonant circuits is not constant from transponder to transponder, and thus, the frequency of the plucking function may require modifications for proper operation. For example, a plucking function that is performed every eight oscillations, i.e., 8-pluck, may be insufficient to maintain oscillations in a low Q factor resonant circuit, e.g., a circuit with a Q factor in the range of about 10 to 40. Moreover, the Q factor of individual resonant circuits may fluctuate, due to the presence of metal or circuits used to dampen other nearby resonators.

Small, inexpensive, and highly reliable transponders are generally desirable. However, transponders may be used in a wide range of applications, and thus, different transponders are commonly designed for different applications. Various transponder embodiments are described in U.S. Pat. No. 5,053,774; which is incorporated herein by reference. Similarly, their associated antennas are designed to meet a variety of needs. The need for different designs causes transponder and antenna costs to increase and may cause their reliability to decrease.

Nevertheless, air coil transponders are sensitive to the close proximity of metal. Distances constituting close proximity are relative to the mass and the geometry of metal objects and to the particular type of metal from which the objects are made. The close proximity of metal tends to detune the antenna circuits, and metal, especially iron and alloys containing iron, tend to dampen the RF signal. Although ferrite rod transponders are generally less sensitive to the close proximity of metal when the rod is positioned parallel to the metal surface, field orientation is often not optimal in such antenna applications. In general, metal objects in a range of less than about 15 mm of the antenna of an air coil transponder are considered in close proximity, and metal objects in a range of between about 8 to 10 mm of the antenna of a ferrite rod transponder are deemed to be within close proximity. Pot core transponders represent an alternative configuration to air coil transponders, but these transponders may attain only limited read ranges due to size and design constraints.

SUMMARY OF THE INVENTION

Thus, a need has arisen for ring antennas with ring, e.g., annular, cores, for use with resonant circuits. Such ring antennas may be mounted on and/or around objects, such as metallic containers, for identifying such objects. A further need has arisen for ring antennas that are capable of extended ranges, e.g., ranges of about 20 to 40 cm, for transmission or reception, or both. These antennas also may be less influenced by the metal from the objects, and their construction also may maintain relatively high, antenna Q factors, e.g., an antenna with a Q factor in the range of about 60 to 100.

In an embodiment, the invention is a ring antenna for resonant circuits, which may be used in transponders, readers, and the like, for identifying objects, e.g., metallic containers. The antenna may comprise a core ring having at least one core surface corresponding to at least one surface of the object and may be made from a ferromagnetic material. For example, the core may have a L-shaped, U-shaped, or rectangular cross-section (hereinafter referred to as L-shaped, U-shaped, and rectangular cores). Further, the core ring may be annular or another closed geometric shape, such as rectangular, triangular, or curvilinear, with a closed perimeter surrounding an open center, and the closed perimeter and the open center may have different shapes. Suitable ferromagnetic materials may include iron, cobalt, and nickel, and their alloys, including steel and those containing ferrite or iron oxide. Moreover, the antenna may include a wire coil including wire made from an electrically conductive material, such as gold, silver, aluminum, nickel, and copper and copper alloys, wound around at least a portion of the core, and a shield made from a non-magnetic material, such as gold, silver, aluminum, copper, and lead, affixed to the at least one core surface, and separating the core from the surface of the object. For example, the shield may have a L-shaped, U-shaped, or I-shaped cross-section and may be affixed the surfaces of the core opposite the surface or surfaces supporting the coil (hereinafter referred to as L-shaped, U-shaped, and I-shaped shields).

In another embodiment, the invention is an interrogation system for identifying objects comprising a resonant circuit, such as may be included in a transponder, a reader, or the like, coupled to a ring antenna. The antenna may comprise a core ring having at least one core surface corresponding to at least one surface of the object and may be made from a ferromagnetic material. A wire coil including wire made from an electrically conductive material is wound around at least a portion of the core, and a shield made from a non-magnetic metallic material is affixed to the at least one core surface and separates the core from the surface of the object.

It is a technical advantage of the antenna of the present invention that it is shaped as a ring and may be placed on and/or around metal objects, such as containers, e.g., kegs, bottles, and gas cylinders, and mounted on vehicles. It further is a technical advantage that the field lines of the antenna are oriented substantially perpendicular to the metallic surface of such objects for superior coupling to the antenna. In particular, it is a technical advantage of this invention that the Q factor obtained for the ring antenna is substantially independent of the proximity of metal. In addition, technical advantages of the antenna include that the antenna is simple to manufacture; that it may be readily modified into various dimensions and shapes to conform to the configurations of a variety of metallic objects, e.g., containers; and that it may be affixed to the metallic object with a right coupling orientation.

Other objects and technical advantages will be apparent to persons of ordinary skill in the art from the following detailed description of the invention and the accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
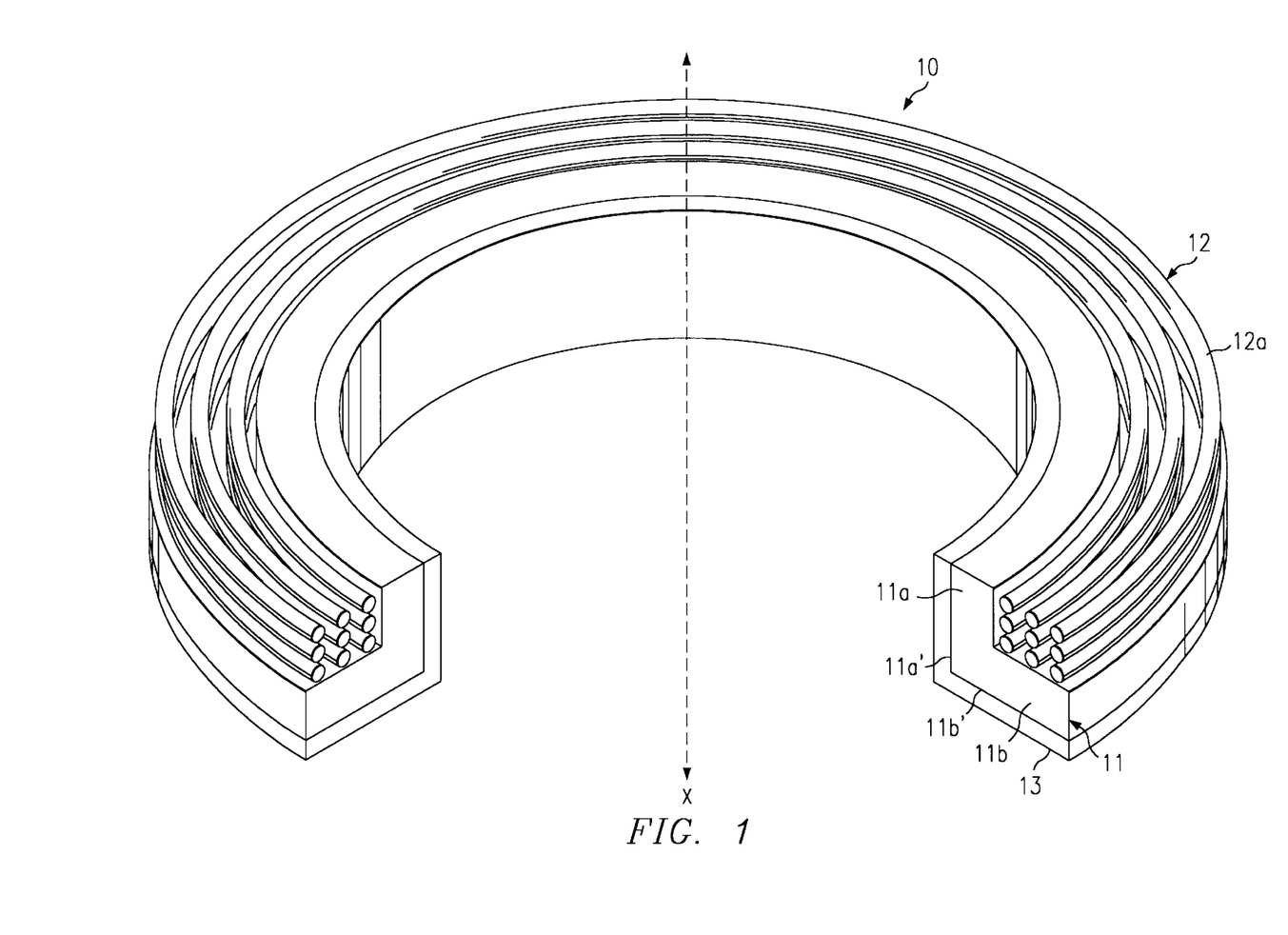
FIG. 1 depicts a cut-away, perspective view of an antenna according to the present invention with an L-shaped core and an L-shaped shield.

Referring to FIG. 1, a cut-away, perspective view of an annular antenna 10 according to the present invention is shown with an annular core 11 with a L-shaped cross-section and an annular shield 13 with a L-shaped cross-section. Unlike a pot core antenna, a core ring, e.g., an annular core, has a closed perimeter surrounding an open center. Annular core 11 has two core surfaces 11a' and 11b', which correspond to two surfaces of a metallic container (not shown), and a first and a second portion 11a and 11b, respectively. Moreover, annular core 11 is made from ferrite and has an axis x indicated by a dashed line. As shown in FIGS. 2–8, the relative thickness and height of a core ring, and consequently, its mass, vary with the configuration, i.e., the size and shape, of the container, on which it is mounted, and the desired transmission or reception characteristics, or both, of the antenna or the system.

Referring again to FIG. 1, a wire may be wound around first portion 11a to form a wire coil 12 which rests upon second portion 11b of annular core 11. Coil 12 includes wire made from an electrically conductive material, such as copper or copper alloys. Although only a few winds of wire 12a are shown in coil 12, the number of winds may vary, for example, with the size of the coil desired and the diameter of wire 12a and the desired inductance (L) for tuning the associated resonant circuit. Further, shield 13 is made from a non-magnetic material, such as aluminum, and, as noted above, is affixed to first and second core surfaces 11a' and 11b' of annular core 11. Shield 13 separates core 11 from the corresponding surfaces of the container (not shown). Such shields may have at least one vertical or cylindrical portion and will have such a cylindrical portion if the antenna is only to be placed around, rather than on, a metallic object. If the antenna is mounted on a metallic object, the shield has a horizontal or disc portion. For example, a screw or rivet may be used to fix a ring antenna and a resonant circuit, such as in a disc-shaped transponder, to a metallic object. The screw or rivet may be positioned at the center axis of the disc-shaped transponder.

Figure 2:
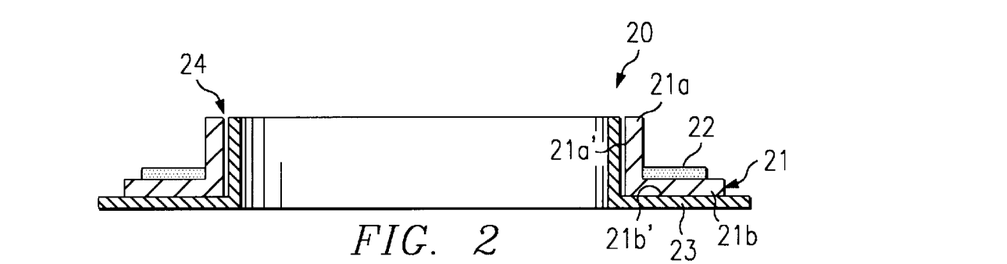
FIG. 2 depicts a cross-sectional view of a second embodiment of the antenna of this invention.

As noted above, FIGS. 2–8 depict various embodiments of the invention designed to conform to the size and shape of various metallic containers, on which they may be mounted, and to achieve desired transmission or reception characteristics, or both. For example, FIG. 2 depicts a ring antenna 20, which has an air gap 24 separating a first core surface 21a' from a cylindrical portion of an L-shaped shield 23. Shield 23, however, is in direct contact with a second portion 21b of a core ring 21 at a second core surface 21b'.

Figure 3:
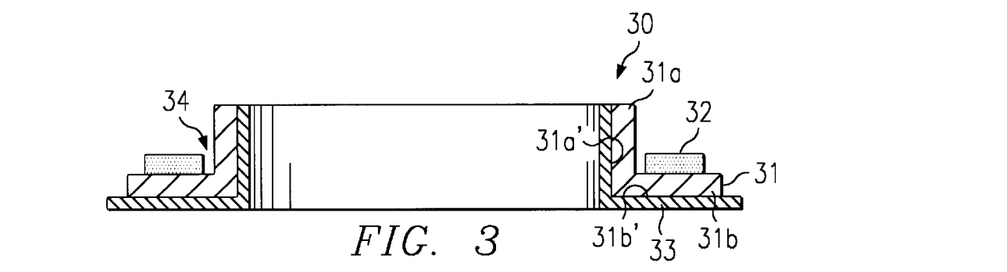
FIG. 3 depicts a cross-sectional view of a third embodiment of the antenna of this invention.

Referring to FIG. 3, an antenna 30 is shown in which an air gap 34 is created between a coil 32 and a first portion 31a of a core ring 31. Coil 32 rests on a second portion 31b of core 31, and an L-shaped shield 33 contacts first portion 31a and second portion 31b of core 31 at a first and a second core surface 31a' and 31b', respectively.

Figure 4:
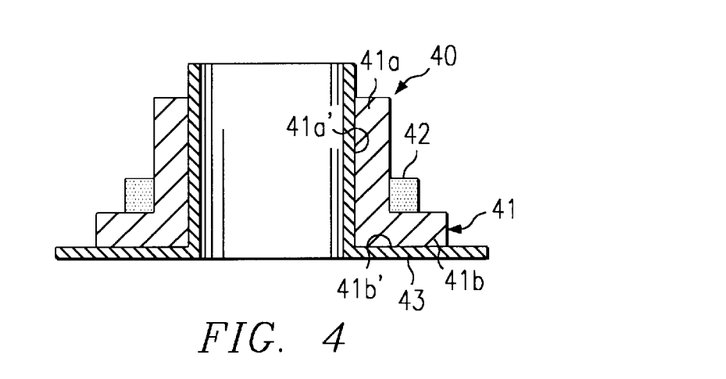
FIG. 4 depicts a cross-sectional view of a fourth embodiment of the antenna of this invention.
Figure 5:
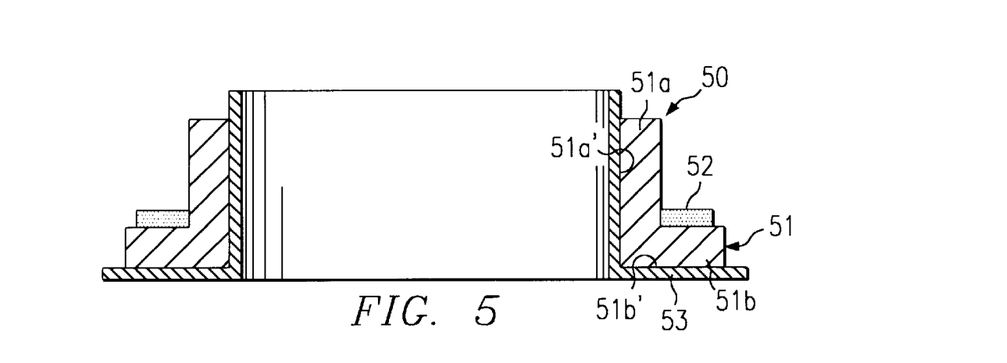
FIG. 5 depicts a cross-sectional view of a fifth embodiment of the antenna of this invention.
Figure 6:
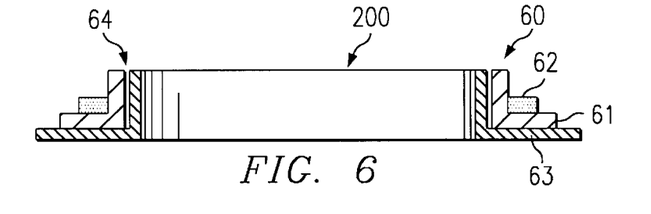
FIG. 6 depicts a cross-sectional view of a sixth embodiment of the antenna of this invention.
Figure 7:
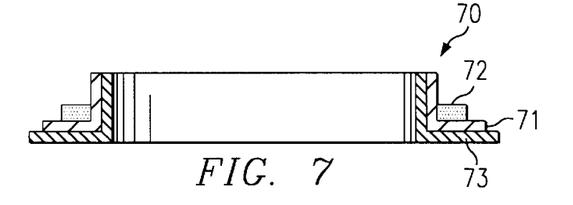
FIG. 7 depicts a cross-sectional view of a seventh embodiment of the antenna of this invention.

FIGS. 4 and 5 depict antennas 40 and 50, respectively. With respect to ring antenna 40, an L-shaped shield 43 extends beyond the upper end of a first portion 41a and the outer end of second portion 41b of a core ring 41. Further, a coil 42 is generally oriented along first portion 41a of core 41. Similarly, with respect to ring antenna 50, an L-shaped shield 53 extends beyond the upper end of a first portion 51a and the outer end of second portion 51b of a core ring 51. However, a coil 52 is generally oriented along second portion 51b of core 51. As noted above, the relative thickness, height, and orientation of the coil, e.g., coils 41 and 51, may vary with the size and shape of the container, on which an antenna is mounted, and with the desired transmission or reception characteristics., or both. Thus, referring to FIGS. 6 and 7, ring antennas 60 and 70 are similar to antennas 20 and 30 depicted in FIGS. 2 and 3, respectively. However, coils 62 and 72 are generally oriented along first portions 61a and 71a of core rings 61 and 71, respectively, while coils 22 and 32 are generally oriented along second portions 21b and 31b of core rings 21 and 31, respectively.

Figure 8A:
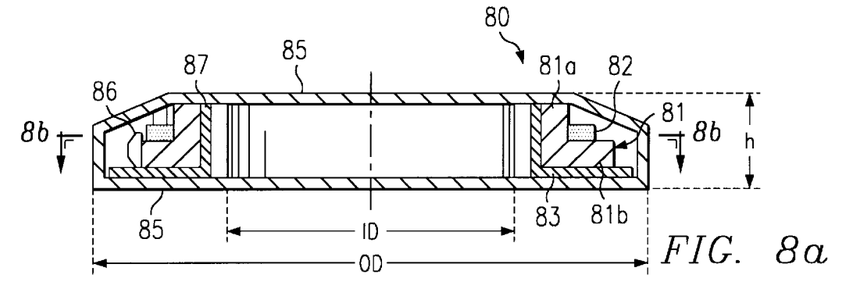
FIG. 8a depicts a cross-sectional view of an eighth embodiment of the antenna of this invention.
Figure 8B:
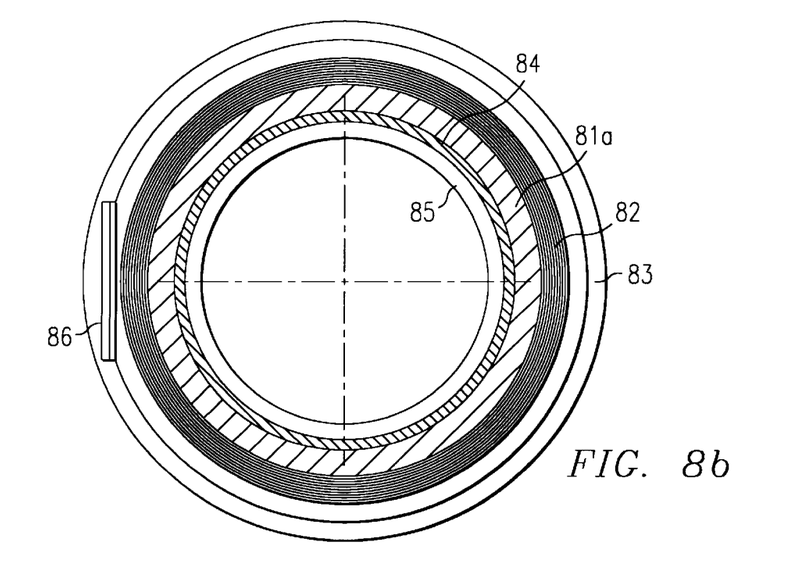
FIG. 8b depicts an end on view of the core and shield of the antenna of FIG. 8a along the Line VIIIb—VIIIb.

Referring to FIG. 8a, an annular antenna 80 includes an annular core 81 and a shield 83 affixed to a second portion 81b of core 81. A coil 82 rests on second portion 81b of core 81, and an electronic circuit 86 is mounted on the periphery of and is electrically connected to coil 82. Such electronic circuits may include a signal generator to generate an oscillating signal and a transistor coupled to and activated and deactivated by the signal generator. They may further include a discriminator for passing signals within a selected frequency range and a processor, e.g., a microprocessor, to process signals passed by the discriminator. Coil 82, core 81, and circuit 86 are contained within a protective and electromagnetically transparent encasement 85, and an air gap 87 is created between encasement 85 and first portion 81a of core 81. In one embodiment, encasement 85 may have an inner diameter (ID) of about 31 mm, an outer diameter (OD) about 60 mm, and a height (h) of about 10 mm. FIG. 8b depicts an overhead, cross-sectional view of FIG. 8a along the Line 8b—8b.

Figure 9A:
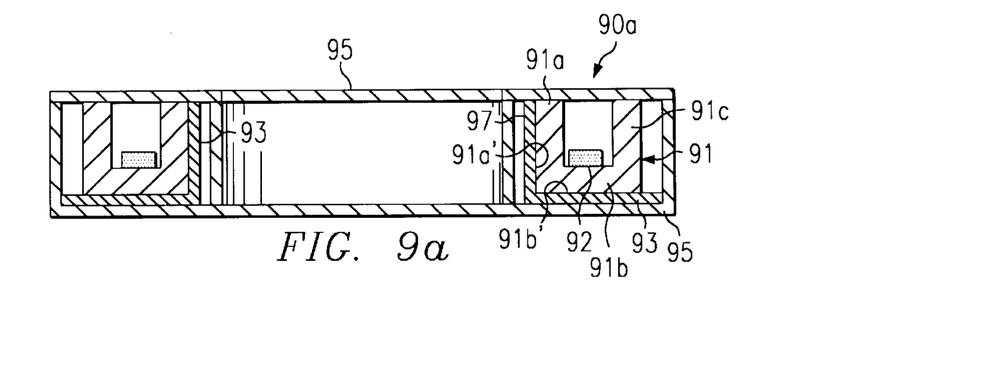
FIG. 9a depicts a cross-sectional view of a ninth embodiment of the antenna of this invention, with a U-shaped core and a L-shaped shield.
Figure 9B:
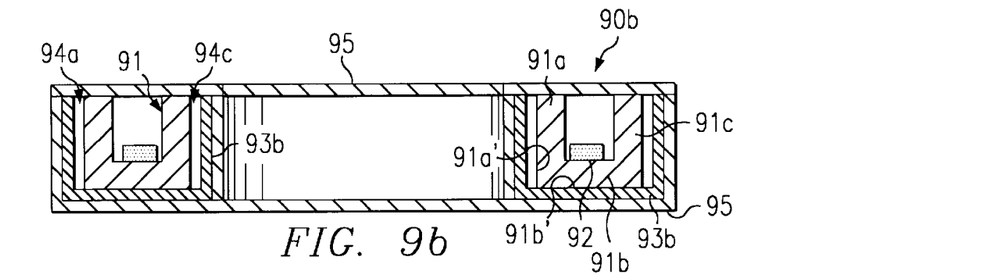
FIG. 9b depicts a cross-sectional view of the antenna of this invention, with a U-shaped core and a U-shaped shield.
Figure 12:
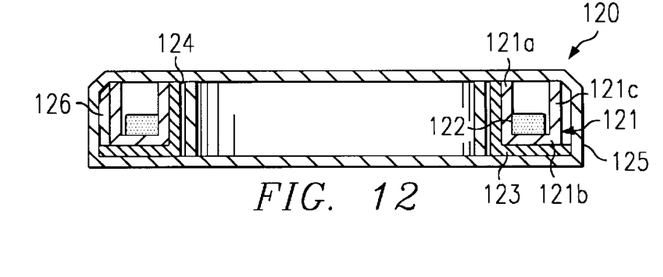
FIG. 12 depicts a cross-sectional view of a twelfth embodiment of the antenna of this invention.

FIGS. 9a–b and 12 depict alternative embodiments of the ring antenna of the present invention, in which the core ring has a U-shaped cross-section. Referring to FIG. 9a, an annular, U-shaped core 91 includes a first portion 91a, a second portion 91b, and a third portion 91c; a coil 92 rests on second portion 91b between first portion 91a and third portion 91c. An L-shaped shield 93a contacts first portion 91a and second portion 91b of core 91 at a first and a second core surface 91a' and 91b', respectively. Coil 92 and core 91 again may be contained within a protective and electromagnetically transparent encasement 95, and an air gap 97 may be created between encasement 95 and the portion of shield 93 in contact with first portion 91a of core 91. Alternatively, referring to FIG. 9b, a U-shaped shield 93b may contact a first portion 91a, a second portion 91b, and a third portion 91c of a U-shaped core 91 at a first, a second, and a third core surfaces 91a', 91b', and 91c', respectively. In addition, as shown in FIG. 9b, air gaps 94a and 94c also may be formed between the cylindrical portions of U-shaped shield 93b and second portion 91b and third portion 91c of core 91. Such U-shaped shields further reduce or eliminate the influence of nearby metal objects on the antenna.

Figure 10:
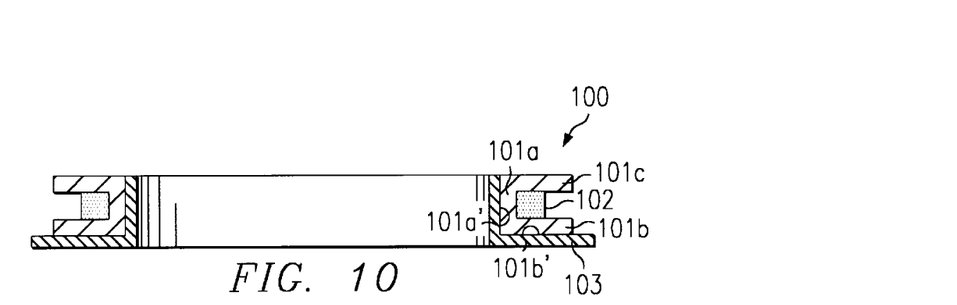
FIG. 10 depicts a cross-sectional view of a tenth embodiment of the antenna of this invention.

Similarly, FIG. 10 depicts still another embodiment of the ring antenna of the present invention, in which the core ring again has a U-shaped cross-section, but is oriented 90° from that shown in FIGS. 9a–b. In FIG. 10, an annular, U-shaped core 101 includes a first portion 101a, a second portion 101b, and a third portion 101c; a coil 102 rests on second portion 101b below first portion 101a and third portion 101c. An L-shaped shield 103 contacts first portion 101a and second portion 101b of core 101 at a first and a second core surfaces 101a' and 101b', respectively.

Figure 13:
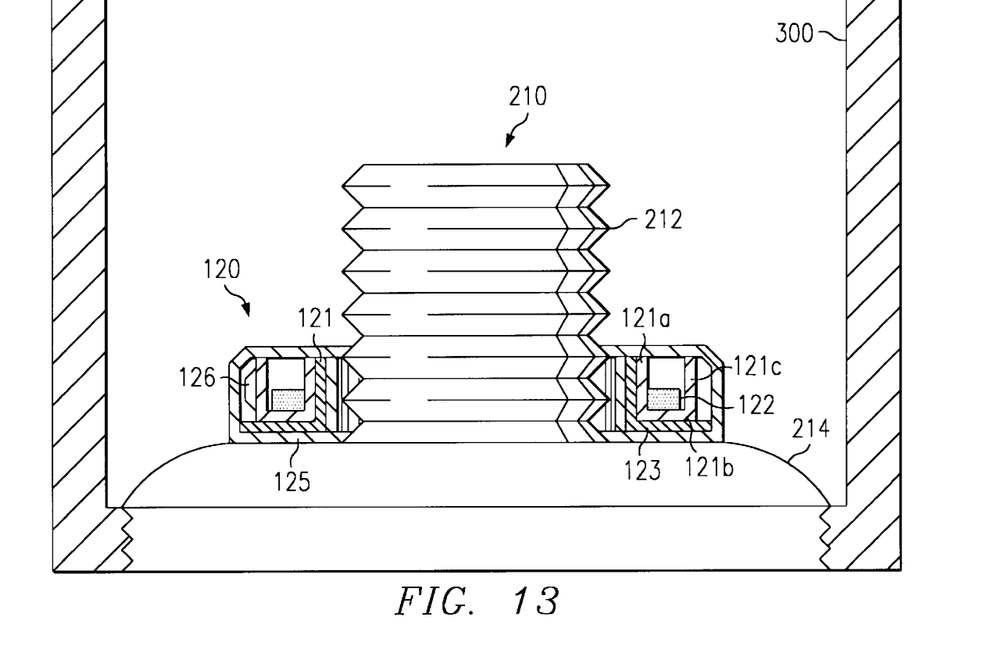
FIG. 13 depicts a cross-sectional view of the antenna of FIG. 12 mounted on a metal gas cylinder.

FIG. 12 depicts yet another embodiment of an annular, U-shaped antenna similar to that shown in FIG. 9a. However, antenna 120 shown in FIG. 12 is enclosed in an encasement 125 with angled exterior upper comers, and, further, encasement 125 encloses an electronic circuit 126. FIG. 13 shows antenna 120 mounted on a bottle, such as a metallic, e.g., steel, gas cylinder 210. Antenna 120 is placed around neck 212 of gas cylinder 210, and encasement 125 is mounted on shoulders 214 of gas cylinder 210. Further, gas cylinder 210 may be fitted with a framework 300 to protect antenna 120 and gas cylinder neck 212 from damage during storage or transportation.

Figure 11:
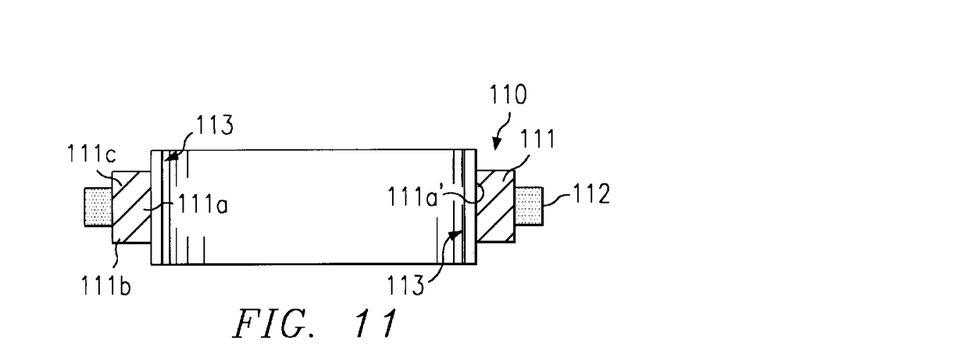
Fig. 11 depicts a cross-sectional view of an eleventh embodiment of the antenna of this invention, with a core having a rectangular cross-section and a I-shaped shield, for mounting around metal objects.

Referring to FIG. 11, a ring antenna 110 is depicted, which has a rectangular core ring 111. Core 111 includes a base portion 111a and an inner perimeter portion 111b, to which I-shaped shield 113 is affixed to core 111 at a first core surface 111a', a coil 112 rests against outer perimeter portion 111c. Antenna 110 is suitable for mounting around metal objects, such as metal containers.

As noted above, the relative thickness and height of the core ring, and consequently, its mass, may vary with the size and shape of the container on which or around which it is mounted, and the desired transmission or reception characteristics, or both. For example, Table I shows dimensions of the annular ferrite cores of embodiments of the ring antennas of FIGS. 2–5, 9a, and to 12.

TABLE I

| FERRITE MASS | rho: | 3.6 DIMENSIONS | | | L-shaped | U-shaped |
|---|---|---|---|---|---|---|
| Figure | ID(mm) | OD(mm) | h(mm) | d(mm) | m(g) | m(g) |
| FIG. 2 | 17 | 34.4 | 15 | 4 | 20.6 | |
| FIG. 3 | 39.4 | 60.2 | 15 | 4 | 45.0 | |
| FIG. 4 | 39.4 | 60.2 | 8 | 2 | 17.3 | |
| FIG. 5 | 37 | 60.2 | 10 | 3 | 28.6 | |
| FIG. 9a–b | 37 | 60.2 | 10 | 3 | | 42.2 |
| FIG. 12 | 34 | 48 | 7 | 1.5 | | 12.5 |

Figure 14A:
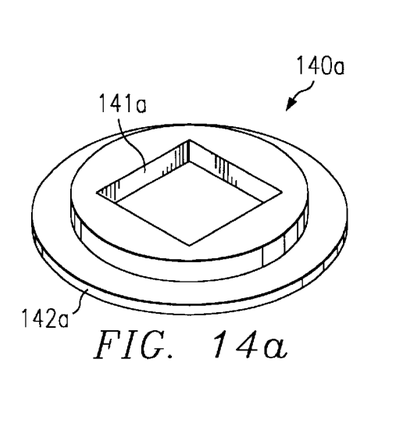
FIGS. 14a–b depict perspective views of core rings with other closed geometric shapes.
Figure 14B:
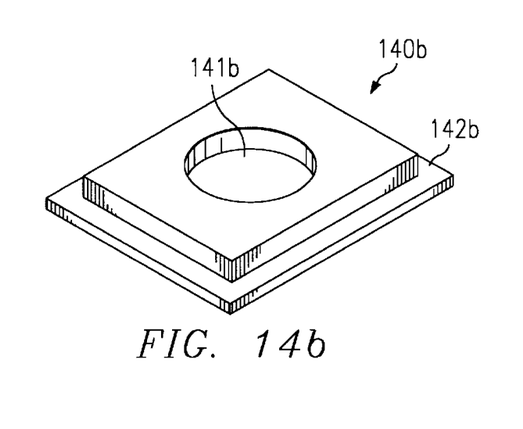

As noted above, a core ring may be annular or another closed geometric shape, such as rectangular, triangular, or curvilinear, with a closed perimeter surrounding an open center. Moreover, the core perimeter and the open center may have different shapes. Referring to FIGS. 14a–b, two, substantially L-shaped cores 140a and 140b are depicted. With respect to FIG. 14a, core 140a has a rectangular open center 141a and an annular closed perimeter 142a, and with respect to FIG. 14b, core 140b has a rectangular open center 141b and an annular closed perimeter 142b. Other possible combinations of perimeter and open center shapes are apparent from these figures.

The invention may be further clarified by consideration of the following examples, which are intended to be purely exemplary of the use of the invention. Further, the superior results revealed by the following tests are exemplary of the performance of embodiments of the ring antenna.

EXAMPLES

Various tests were performed on an antenna similar in configuration to that described in FIGS. 9a–b. The antenna had an interior diameter of about 44.5 mm, an outer diameter of about 51 mm, a height of about 8 mm, and a depth of about 1.85 mm. The coil was formed of one hundred and twelve (112) winds of copper wire with a diameter of about 0.2 mm. These tests included measurements of antennas placed around and on a variety of bottles and surfaces. Further, the antennas were tested with inside cylindrical portions or outside cylindrical portions, or both, or without any cylindrical portions.

Tables IIA and IIB depict the results of the tests of (1) the coil alone without a core, (2) the coil surrounding a ferrite core, (3) the coil surrounding a ferrite core with an aluminum disc portion, (4) the antenna mounted on a steel gas cylinder, (5) the antenna mounted on a steel gas cylinder with a gas valve, (6) the antenna mounted on a steel gas cylinder with a protective cap, (7) the antenna mounted on a steel gas cylinder with a gas valve and a protective cap, (8) the antenna on an aluminum plate, (9) the antenna on a steel plate and, (10) the antenna surrounding a steel core placed on a steel plate. The bottle described in Tables IIA and IIB is a steel gas cylinder with a height of about 60 cm and a diameter of about 15 cm. Moreover, the bottle may be fitted with a brass valve commonly used on gas, e.g., oxygen, cylinders or with a tulip-shaped steel cap, or both. The programmed frequency is the frequency to which the resonant circuit is tuned, for example, by use of switching capacitors. The offset is the difference in frequency measured between the resonance frequency of a transponder, i.e., of the resonant circuit, and the reference frequency of a given interrogation system. For example, the reference frequency used in the examples described in Tables IIA and IIB was about 134 kHz. These tables demonstrate the superior results achieved by the present invention.

Figure 15:
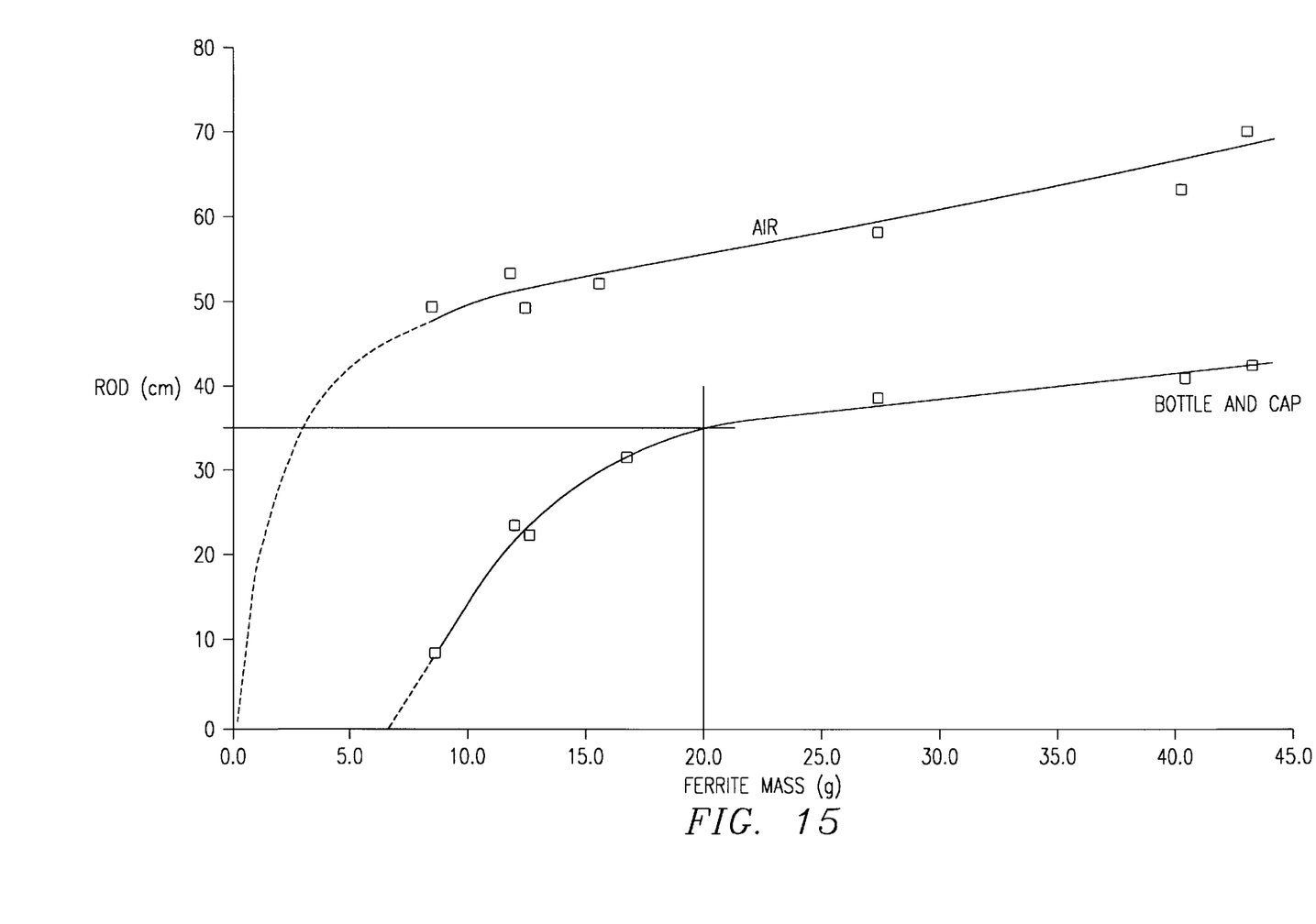
FIG. 15 is a graph depicting the radius of detection (ROD) in centimeters (cm) measured for various masses in grams (g) for embodiments of FIGS. 12–13.

In addition, Tables IIA and IIB describe test results for the embodiment of FIGS. 9a–b in the dimensions described above. In particular, these tables show the Δ freq. (kHz) measured under the various test conditions described above, the Q factor, and radius of detection (ROD) in centimeters (cm). Finally, FIG. 15 shows the radius of detection (ROD) in centimeters (cm) measured for the various core masses in grams (g) for the embodiments of FIGS. 12–13 placed in surrounded by air or mounted on a cylinder with a protective cap. As shown in FIG. 15, the mass of ferrite may result in the reduction of the detuning effect caused by a relatively large and proximate metallic mass. This is demonstrated by the reduction in ROD caused by placement of the annular ferrite core on a gas cylinder equipped with a protective cap.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. A ring antenna for a resonant circuit for mounting on or around an object comprising:
a core ring having a first core surface and a second core surface wherein said core ring is made from a ferromagnetic material;
a wire coil including wire made from an electrically conductive material; and

TABLE IIA

| Configuration =<br>FIGS. 9a–b<br>Configuration | no cylindrical portion | | | | | inside cylindrical portion | | | | |
|---|---|---|---|---|---|---|---|---|---|---|
| | L<br>mH | Q | ΔF<br>kHz | | ROD<br>cm 8-<br>pluck | L<br>mH | Q | ΔF<br>kHz | | ROD<br>cm 8-<br>pluck |
| Coil | 1.004 | 55.8 | | | | | | | | |
| Coil + Ferrite | 2.611 | 101.5 | −2.7 | | | 2.489 | 76.4 | 0.5 | | |
| Coil + ferrite + Al disc portion | 2.509 | 89.4 | 0 | 0 | 59 | 2.415 | 70 | 2.5 | 0 | 64 |
| Bottle | 2.502 | 88.3 | 0.2 | 0.2 | 57 | 2.394 | 70.9 | 3.1 | 0.6 | 60 |
| Bottle + valve | 2.414 | 78.6 | 2.5 | 2.5 | 69 | 2.362 | 71.3 | 3.9 | 1.4 | 62 |
| Bottle + cap | 2.472 | 89.6 | 1.0 | 1.0 | 37 | 2.382 | 72.6 | 3.4 | 0.9 | 39 |
| Bottle + valve + cap | 2.399 | 80.7 | 2.9 | 2.9 | 34 | 2.352 | 73.6 | 4.2 | 1.7 | 36 |
| On Al plate | 2.478 | 94.6 | 0.8 | 0.8 | 43 | 2.390 | 71.4 | 3.2 | 0.7 | 46 |
| On Steel plate | 2.488 | 82.7 | 0.6 | 0.6 | 45 | 2.210 | 67.7 | 2.6 | 0.1 | 46 |
| Steel plate with core | 2.420 | 27.2 | 2.4 | 2.4 | 0 | 2.384 | 38.2 | 3.3 | 0.8 | 0 |
| Programmed freq. (kHz) | | | | | 131.3 | | | | | 132.5 |
| Offset (Hz) | | | | | −2700 | | | | | −1500 |

TABLE IIB

| Configuration =<br>FIGS. 9a–b<br>Configuration | outside cylindrical portion | | | | | in + outside cylindrical portion | | | | |
|---|---|---|---|---|---|---|---|---|---|---|
| | L<br>mH | Q | ΔF<br>kHz | | ROD<br>cm 8-<br>pluck | L<br>mH | Q | ΔF<br>kHz | | ROD<br>cm 8-<br>pluck |
| Coil | | | | | | | | | | |
| Coil + Ferrite | 2.413 | 70.5 | 2.6 | | | 2.333 | 62.8 | 4.7 | | |
| Coil + ferrite + Al disc portion | 2.391 | 72.2 | 3.2 | 0 | 46 | 2.316 | 62.4 | 5.2 | 0 | 46 |
| Bottle | 2.348 | 72.7 | 4.3 | 1.1 | 46 | 2.271 | 62.5 | 6.4 | 1.2 | 47 |
| Bottle + valve | 2.286 | 69.2 | 6 | 2.8 | 45 | 2.252 | 64.9 | 6.9 | 1.7 | 44 |
| Bottle + cap | 2.372 | 74.3 | 3.7 | 0.5 | 25 | 2.305 | 64.4 | 5.5 | 0.3 | 25 |
| Bottle + valve + cap | 2.314 | 71.0 | 5.2 | 2.1 | 26 | 2.287 | 66.3 | 5.9 | 0.8 | 23 |
| On Al plate | 2.377 | 74.6 | 3.5 | 0.4 | 37 | 2.306 | 62.6 | 5.4 | 0.3 | 36 |
| On Steel plate | 2.404 | 72.9 | 2.8 | −0.3 | 37 | 2.333 | 64 | 4.7 | −0.5 | 36 |
| Steel plate with core | 2.343 | 29.9 | 4.4 | 1.3 | 0 | 2.306 | 42.4 | 5.4 | 0.3 | 0 |
| Programmed freq. (kHz) | | | | | 132.1 | | | | | 133.4 |
| Offset (Hz) | | | | | −1900 | | | | | −600 | a shield made from a non-magnetic material, affixed to said second core surface thereby separating said core from a surface of said object, and wherein said shield is separated from said first core surface by an air gap.

2. The antenna of claim 1, wherein said core has a L-shaped cross-section and includes a first portion and a second portion.

3. The antenna of claim 2, wherein said shield has a L-shaped cross-section.

4. The antenna of claim 1, wherein said ferromagnetic material is selected from the group consisting of iron, steel, cobalt, nickel, and ferrite.

5. The antenna of claim 1, wherein said electrically conductive material is selected from a group consisting of gold, silver, aluminum, nickel, and copper and copper alloys.

6. The antenna of claim 1, wherein said non-magnetic material is selected from the group consisting of copper, aluminum, silver, and lead.

7. A ring antenna for a resonant circuit for mounting on or around an object comprising:

a core ring having a first core surface and a second core surface wherein said core ring is made from a ferromagnetic material;

a wire coil including wire made from an electrically conductive material wound around at least a portion of said core and having a first coil surface and a second coil surface wherein an air gap separates said first coil surface and said first core surface and said second coil surface is affixed to said second core surface; and a shield made from a non-magnetic material, affixed to said at least one of said core surfaces thereby separating said core from a surface of said object.

8. The antenna of claim 7, wherein said core has a L-shaped cross-section and includes a first portion and a second portion.

9. The antenna of claim 7, wherein said shield has a L-shaped cross-section.

10. The antenna of claim 7, wherein said ferromagnetic material is selected from the group consisting of iron, steel, cobalt, nickel, and ferrite.

11. The antenna of claim 7, wherein said electrically conductive material is selected from a group consisting of gold, silver, aluminum, nickel, and copper and copper alloys.

12. The antenna of claim 7, wherein said non-magnetic material is selected from the group consisting of copper, aluminum, silver, and lead.

13. A ring antenna for a resonant circuit for mounting on or around an object comprising:

a core ring having a first core surface and a second core surface and a third core surface wherein said core ring is made from a ferromagnetic material;

a wire coil including wire made from an electrically conductive material wound around at least a portion of said second core surface;

an electromagnetically transparent encasement for encasement of said coil and said core ring; and a shield made from a non-magnetic material affixed to said first and second core surfaces, and wherein an air gap exists between said encasement and said shield at the point wherein said shield is affixed to said first core surface.

14. The antenna of claim 13, wherein said core has a U-shaped cross-section and includes a first portion and a second portion and a third portion.

15. The antenna of claim 14, wherein said shield has a L-shaped cross-section.

16. The antenna of claim 14, wherein said ferromagnetic material is selected from the group consisting of iron, steel, cobalt, nickel, and ferrite.

17. The antenna of claim 14, wherein said electrically conductive material is selected from a group consisting of gold, silver, aluminum, nickel, and copper and copper alloys.

18. The antenna of claim 14, wherein said non-magnetic material is selected from the group consisting of copper, aluminum, silver, and lead.

19. A ring antenna for a resonant circuit for mounting on or around an object comprising:

a core ring having a first core surface and a second core surface and a third core surface wherein said core ring is made from a ferromagnetic material;

a wire coil including wire made from an electrically conductive material wound around at least a portion of said second core surface;

an electromagnetically transparent encasement for encasement of said coil and said core ring; and a shield made from a non-magnetic material, affixed to said second core surface, and wherein an air gap exists between said shield and said first core surface and said shield and said third core surface.

20. The antenna of claim 19, wherein said core has a U-shaped cross-section and includes a first portion and a second portion and a third portion.

21. The antenna of claim 19, wherein said shield has a U-shaped cross-section.

22. The antenna of claim 19, wherein said ferromagnetic material is selected from the group consisting of iron, steel, cobalt, nickel, and ferrite.

23. The antenna of claim 19, wherein said electrically conductive material is selected from a group consisting of gold, silver, aluminum, nickel, and copper and copper alloys.

24. The antenna of claim 19, wherein said non-magnetic material is selected from the group consisting of copper, aluminum, silver, and lead.

25. A ring antenna for a resonant circuit for mounting on or around an object comprising:

a core ring having a first core surface with an upper end and a second core surface with a an outer end wherein said core ring is made from a ferromagnetic material;

a wire coil including wire made from an electrically conductive material wound around at least a portion of said second core surface; and a shield made from a non-magnetic material, affixed to at least a portion of said core thereby separating said core from a surface of said object, and wherein said shield extends beyond the upper end of said first core surface and the outer end of said second core surface.

26. The antenna of claim 25, wherein said core has a L-shaped cross-section and includes a first portion and a second portion.

27. The antenna of claim 25, wherein said shield has a L-shaped cross-section.

28. The antenna of claim 25, wherein said ferromagnetic material is selected from the group consisting of iron, steel, cobalt, nickel, and ferrite.

29. The antenna of claim 25, wherein said electrically conductive material is selected from a group consisting of gold, silver, aluminum, nickel, and copper and copper alloys.

30. The antenna of claim 25, wherein said non-magnetic material is selected from the group consisting of copper, aluminum, silver, and lead.

* * * * *